(12) United States Patent
Kato (10) Patent No.: US 6,731,869 B2
(45) Date of Patent: May 4, 2004

(54) ELECTRICAL CONNECTING STRUCTURE IN LENS BARRELS OF CAMERAS

(75) Inventor: Koichi Kato, Saitama-ken (JP)

(73) Assignee: Fuji Photo Optical Co., Ltd., Saitama-ken (JP)

(*) Notice: Subject to any disclaimer, the term of this patent is extended or adjusted under 35 U.S.C. 154(b) by 0 days.

(21) Appl. No.: 10/108,660

(22) Filed: Mar. 28, 2002

(65) Prior Publication Data

US 2002/0141757 A1 Oct. 3, 2002

(30) Foreign Application Priority Data

Mar. 29, 2001 (JP) ............................. 2001-094542

(51) Int. Cl.$^7$ ................. G03B 3/10; G03B 13/34; G03B 17/04; G03B 5/02
(52) U.S. Cl. ................. 396/133; 396/349; 396/542
(58) Field of Search .................. 376/542, 531, 376/72, 85; 359/699, 703, 823; 341/148, 749, 752; 396/133, 349

(56) References Cited

U.S. PATENT DOCUMENTS

| | | | |
|---|---|---|---|
| 4,834,514 A | | 5/1989 | Atsuta et al. ............. 350/429 |
| 5,079,577 A | * | 1/1992 | Nomura ..................... 396/72 |
| 5,349,475 A | * | 9/1994 | Nomura et al. ........... 359/694 |
| 6,256,458 B1 | * | 7/2001 | Iwasa ....................... 396/85 |

* cited by examiner

Primary Examiner—David Gray
Assistant Examiner—Rochelle Blackman
(74) Attorney, Agent, or Firm—Clifford Chance US LLP (57) ABSTRACT

A movable rear-set lens of a camera has at least one flat peripheral region. A cam follower on the side of the flat peripheral region is located such that a predetermined space is formed on the side outward from the flat peripheral region. The predetermined space is ensured between a front-set lens and the rear-set lens when the rear-set lens takes a position optically closest to the front-set lens. An electrical wiring from a shutter section passes in the vicinity of the flat peripheral region and extends toward a camera main body. An electrical connecting section, at which a certain part of the electrical wiring and a wiring extending from a shutter actuating section associated with the shutter section are connected, is located within the predetermined space.

4 Claims, 8 Drawing Sheets

ELECTRICAL CONNECTING STRUCTURE IN LENS BARRELS OF CAMERAS

CROSS-REFERENCE TO RELATED APPLICATION

This application claims priority to Japanese patent application number 2001-094542 filed Mar. 29, 2001.

BACKGROUND OF THE INVENTION

1. Field of the Invention

This invention relates to an electrical connecting structure in a lens barrel of a camera. This invention particularly relates to an electrical connecting structure in a lens barrel of a camera provided with a zoom lens, wherein a certain part of an electrical wiring, which electrical wiring is electrically connected to a sensor of a shutter section of the camera, and an electrical wiring of a shutter actuating section for actuating a shutter so as to open and close the shutter are connected to each other.

2. Description of the Related Art

In order for shutters of cameras to be opened and closed, shutter blades located within a shutter section are actuated by an actuator (i.e., a shutter actuating section) In ordinary cameras and cameras provided with zoom lenses, the actuator is located on the side forward or backward from a wall member, which constitutes the shutter section and is approximately normal to an optical axis direction. A conventional technique, in which the actuator is located on the side backward from the shutter section, is disclosed in, for example, Japanese Unexamined Patent Publication No. 63(1988)-208013 (Japanese Patent No. 2649516). The disclosed conventional technique concerns a camera provided with a zoom lens, in which an actuator is located between a front-set lens and a rear-set lens capable of moving with respect to the front-set lens.

Ordinarily, the actuator is constituted of a member, such as a solenoid device. An electrical wiring for supplying electric power to the actuator is connected within the lens barrel to the side of the camera main body.

Also, the shutter section is provided with a sensing section (i.e., a sensor) for detecting a position, to which the lens has been delivered within the lens barrel, and obtaining an accurate degree of shutter opening. An electrical wiring, which extends toward the camera main body, is connected to the sensing section. The electrical wiring for supplying electric power to the actuator and apart of the electrical wiring extending from the shutter section are electrically connected to each other at an electrical connecting section within the lens barrel.

In cases where the zoom lens is utilized, the rear-set lens is moved toward the shutter section, i.e. forwardly, and therefore the problems occur in that a required space cannot easily be ensured on the side backward from the shutter section. With the conventional technique described above, a lens diameter is set to be small, and a required space is thereby ensured at a peripheral region of the shutter section. However, if the lens diameter is set to be large, the space for accommodating the electrical connecting section or the actuator cannot always be ensured. Also, in cases where the electrical connecting section or electric parts, such as the actuator, are large, the problems occur in that the space for accommodating the electrical connecting section or the electric parts cannot be ensured within the lens barrel.

SUMMARY OF THE INVENTION

The primary object of the present invention is to provide an electrical connecting structure in a lens barrel of a camera, wherein an electrical connecting section and electric parts are capable of being located within a narrow space in a lens barrel, and a size of a camera provided with a zoom lens is capable of being set to be small.

The present invention provides an electrical connecting structure in a lens barrel of a camera, the camera comprising a shutter section located within a lens barrel, a front-set lens secured to the shutter section, and a rear-set lens, which is associated with a plurality of cam followers and is driven through a cam so as to move along an optical axis direction and with respect to the front-set lens, an electrical connecting section, at which a certain part of an electrical wiring extending from the shutter section toward a camera main body and an electrical wiring extending from a shutter actuating section associated with the shutter section are electrically connected to each other, being located within the lens barrel, wherein the rear-set lens has at least one flat peripheral region at a periphery of the rear-set lens, a cam follower, which is disposed on the side of the flat peripheral region of the rear-set lens, is located such that a predetermined space is formed on the side outward from the flat peripheral region of the rear-set lens, the predetermined space is ensured between the front-set lens and the rear-set lens in a state, in which the rear-set lens takes a position optically closest to the front-set lens, the electrical wiring, which extends from the shutter section toward the camera main body, passes through a position in the vicinity of the flat peripheral region of the rear-set lens and extends toward the camera main body, and the electrical connecting section is located within the predetermined space.

The electrical connecting structure in a lens barrel of a camera in accordance with the present invention may be modified such that the electrical wiring, which extends from the shutter section toward the camera main body, is constituted of a long, narrow strip-shaped flexible circuit board, the long, narrow strip-shaped flexible circuit board is provided with a circuit extension at a part, which is to be located within the predetermined space, the circuit extension being projected from the part of the long, narrow strip-shaped flexible circuit board in a direction intersecting with a longitudinal direction of the long, narrow strip-shaped flexible circuit board, and the circuit extension is folded back so as to act as the electrical connecting section having electrodes on the side facing the shutter actuating section.

Alternatively, the electrical connecting structure in a lens barrel of a camera in accordance with the present invention may be modified such that the electrical wiring, which extends from the shutter section toward the camera main body, is constituted of a long, narrow strip-shaped flexible circuit board, the long, narrow strip-shaped flexible circuit board is provided with conductor pads at a part, which is to be located within the predetermined space, one of two connectors is electrically connected to the conductor pads, the other connector is electrically connected to the electrical wiring, which extends from the shutter actuating section, and the electrical connecting section, at which the one connector and the other connector are electrically connected to each other, is located within the predetermined space.

Also, the electrical connecting structure in a lens barrel of a camera in accordance with the present invention may be modified such that the rear-set lens also has a different flat peripheral region at the periphery of the rear-set lens, which periphery is on the side facing the shutter actuating section, and the shutter actuating section and the electrical connecting section are located on the sides opposite to each other with the optical axis intervening therebetween.

With the electrical connecting structure in a lens barrel of a camera in accordance with the present invention, the rear-set lens, which is moved along the optical axis direction and with respect to the front-set lens, has at least one flat peripheral region at the periphery of the rear-set lens. Also, the cam follower, which is disposed on the side of the flat peripheral region of the rear-set lens, is located such that the predetermined space is formed on the side outward from the flat peripheral region of the rear-set lens. The predetermined space is ensured between the front-set lens and the rear-set lens in the state, in which the rear-set lens takes the position optically closest to the front-set lens. Further, the electrical wiring, which extends from the shutter section toward the camera main body, passes through the position in the vicinity of the flat peripheral region of the rear-set lens and extends toward the camera main body, and the electrical connecting section is located within the predetermined space. Therefore, the predetermined space is capable of being ensured within the narrow space in the lens barrel of the camera, and the electrical connections are capable of being made within the predetermined space. Accordingly, the size of the camera is capable of being set to be small. Also, with the electrical connecting structure in a lens barrel of a camera in accordance with the present invention, wherein the flat peripheral region is formed at the periphery of the rear-set lens, the electrical wiring, which extends from the shutter section toward the camera main body, is capable of passing through the position in the vicinity of the flat peripheral region of the rear-set lens. Therefore, at the time of a zooming operation, the movable lens is capable of moving smoothly without interfering with the electrical wiring.

With the modification of the electrical connecting structure in a lens barrel of a camera in accordance with the present invention, the electrical wiring, which extends from the shutter section toward the camera main body, may be constituted of the long, narrow strip-shaped flexible circuit board, and the long, narrow strip-shaped flexible circuit board may be provided with the circuit extension at the part, which is to be located within the predetermined space, the circuit extension being projected from the part of the long, narrow strip-shaped flexible circuit board in the direction intersecting with the longitudinal direction of the long, narrow strip-shaped flexible circuit board. Also, the circuit extension may be folded back so as to act as the electrical connecting section having the electrodes on the side facing the shutter actuating section. With the modification described above, the small electrical connecting section is capable of being acquired within the predetermined space, which is ensured in the manner described above, and therefore the risk that the electrical wiring will interfere with other parts is capable of reduced even further.

With the different modification of the electrical connecting structure in a lens barrel of a camera in accordance with the present invention, the electrical wiring, which extends from the shutter section toward the camera main body, may be constituted of the long, narrow strip-shaped flexible circuit board, and the long, narrow strip-shaped flexible circuit board may be provided with the conductor pads at the part, which is to be located within the predetermined space. One of the two connectors may be electrically connected to the conductor pads, and the other connector may be electrically connected to the electrical wiring, which extends from the shutter actuating section. Also, the electrical connecting section, at which the one connector and the other connector are electrically connected to each other, may be located within the predetermined space. With the different modification described above, a wide variety of electrical connecting sections constituted of the connectors, which may be of various different sizes and various different types, are capable of being located within the predetermined space.

With the further different modification of the electrical connecting structure in a lens barrel of a camera in accordance with the present invention, the rear-set lens may also have a different flat peripheral region at the periphery of the rear-set lens, which periphery is on the side facing the shutter actuating section, and the shutter actuating section and the electrical connecting section may be located on the sides opposite to each other with the optical axis intervening therebetween. With the further different modification described above, a shutter actuating section having a comparatively large size and an electrical connecting section having a comparatively large size are capable of being located within the lens barrel of the camera.

DESCRIPTION OF THE PREFERRED EMBODIMENTS

The present invention will hereinbelow be described in further detail with reference to the accompanying drawings.

Figure 1:
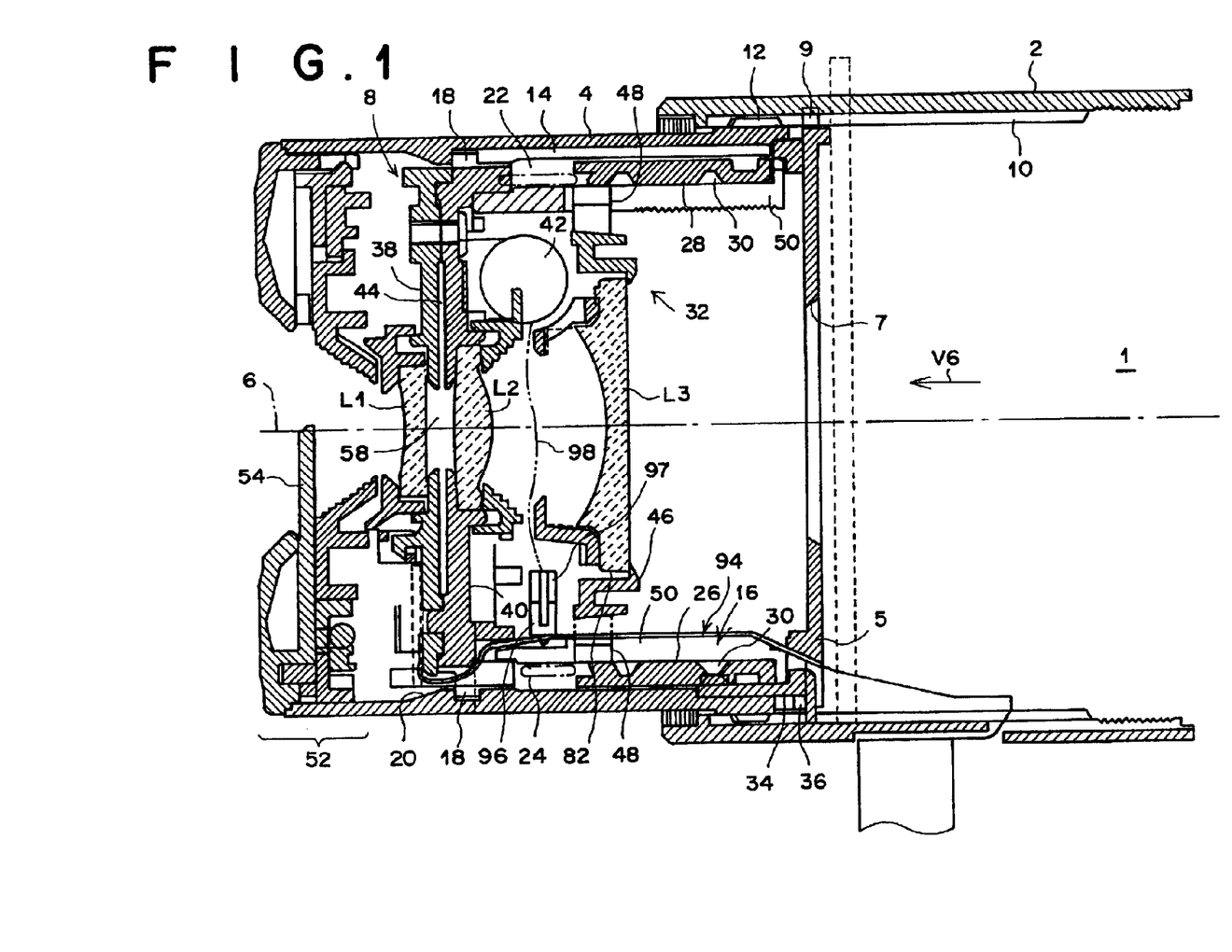
FIG. 1 is a partial sectional view showing a lens barrel of a camera, in which a first embodiment of the electrical connecting structure in a lens barrel of a camera in accordance with the present invention is employed.

FIG. 1 is a partial sectional view showing a lens barrel of a camera, in which a first embodiment of the electrical connecting structure in a lens barrel of a camera in accordance with the present invention is employed. The term "forward" or the term "front" as used hereinbelow means the side on which an object to be photographed (not shown) lies, as viewed from a camera.

With reference to FIG. 1, a fixed cylinder 2, which has a circular cylindrical shape, is secured to a camera body (not shown). A movable cylinder 4, which has a circular cylindrical shape, is fitted into the fixed cylinder 2 such that the movable cylinder 4 is capable of sliding along the direction of an optical axis 6 of lenses L (lenses L1, L2, and L3) within a lens barrel. A rectilinear moving cylinder 16 provided with a shutter unit (i.e., a shutter section) 8 is located within the movable cylinder 4. An approximately circular disk-shaped rectilinear moving key-ring 5 is secured by screws (not shown) to aback section of the rectilinear moving cylinder 16. The rectilinear moving key-ring 5 has a rectangular opening 7, through which light passes toward an image formation side at the time of photographing. A key 9 is projected from a top surface of the rectilinear moving key-ring 5. The key 9 is accommodated in a key slot (not shown) of the fixed cylinder 2 extending along the direction of the optical axis 6. Also, a convex rib (not shown) is formed at an outer periphery of the rectilinear moving key-ring 5. The convex rib of the rectilinear moving key-ring 5 moves in a corresponding groove (not shown) of the fixed cylinder 2 and along the direction of the optical axis 6. In this manner, the rectilinear moving cylinder 16 and the rectilinear moving key-ring 5 are capable of moving together with each other within the fixed cylinder 2.

A gear ring (i.e., a focusing ring) 34 is mounted on the back end section of the movable cylinder 4 such that the focusing ring 34 rotates together with the movable cylinder 4. A gear 36 is formed over a predetermined range on the outer periphery of the focusing ring 34. The gear 36 is formed on the outer side and is driven for rotation by a motor (not shown) via a gear train (not shown) comprising a plurality of gears. The movable cylinder 4 is rotated by the rotation of the gear 36.

A spiral groove 10 is formed on an inner peripheral surface of the fixed cylinder 2. Also, a helicoidal gear 12 for engaging with the spiral groove 10 is formed on an outer periphery of a back end section of the movable cylinder 4. When the movable cylinder 4 is rotated by a motor (not shown), the movable cylinder 4 is moved by the co-operation of the helicidal gear 12 and the spiral groove 10. In this manner, the movable cylinder 4 is delivered forwardly from the fixed cylinder 2 or is retracted backwardly into the fixed cylinder 2, while the movable cylinder 4 is rotating.

A predetermined number of straight grooves 14, 14, . . . are formed on the inner surface of the movable cylinder 4. The straight grooves 14, 14, . . . extend along the direction of the optical axis 6 and are open at the back end of the movable cylinder 4. An annular projection 20, which is projected inwardly, is formed at the front ends of the straight grooves 14, 14, . . . The shutter section 8 is mounted on the front part of the rectilinear moving cylinder 16. Protrusions 18, 18, . . . are formed on the outer periphery of the shutter section 8 and at positions corresponding to the straight grooves 14, 14, . . . An annular recess 22 is formed on the outer periphery of the rectilinear moving cylinder 16. A cam cylinder 26 is located within the annular recess 22 such that the cam cylinder 26 is capable of rotating around the rectilinear moving cylinder 16. The cam cylinder 26 is urged backwardly by a coiled spring 24. The cam cylinder 26 has a rib (not shown) formed at a predetermined position on the outer periphery of the rectilinear moving cylinder 16 so as to extend along the direction of the optical axis 6.

In order for the rectilinear moving cylinder 16 to be fitted into the movable cylinder 4, the positions of the protrusions 18, 18, . . . of the rectilinear moving cylinder 16 are matched with the positions of the straight grooves 14, 14, . . . , and the rectilinear moving cylinder 16 is inserted into the movable cylinder 4 until the protrusions 18, 18, . . . of the rectilinear moving cylinder 16 come into abutment with the annular projection 20. At this time, the rib of the cam cylinder 26 and a corresponding groove (not shown) formed on the inner surface of the movable cylinder 4 engage with each other, such that the cam cylinder 26 is capable of being rotated around the rectilinear moving cylinder 16 simultaneously with the rotation of the movable cylinder 4. A spiral cam groove 30 is formed on an inner peripheral surface 28 of the cam cylinder 26. A movable lens unit (i.e., a movable lens section) 32, which will be described later, engages with the spiral cam groove 30. When the cam cylinder 26 rotates, the movable lens section 32 is driven by the spiral cam groove 30 so as to move along the direction of the optical axis 6. The movable lens section 32 will later be described in detail.

The shutter section 8 will be described hereinbelow. The shutter section 8 comprises two approximately circular disk-like shutter bases, i.e. a wall member 38 and a wall member 40, which stand facing each other and are secured by screws to each other. The shutter section 8 also comprises the lens L1 secured to the wall member 38 and the lens L2 secured to the wall member 40. The lens L1 and the lens L2 constitute a front-set lens. The shutter section 8 further comprises a solenoid device (i.e., a shutter actuating section) 42 for actuating the shutter section 8. The wall member 38 and the wall member 40 are constituted such that, when the wall member 38 and the wall member 40 are secured to each other, a circular disk-shaped space, i.e. a shutter chamber 44, is formed between the wall member 38 and the wall member 40. Shutter blades (not shown) are located within the shutter chamber 44.

Within the lens barrel, a flexible circuit board (FPC) 94 is electrically connected to the front side of the shutter section 8. The flexible circuit board 94 passes through a position under the shutter section 8, then passes through a position under the movable lens section 32, and extends toward a camera main body 1. In this embodiment, conductor pads 106, 106 (shown in FIG. 5) acting as electrodes of the circuit are formed at a certain part of the electrical wiring, i.e. the flexible circuit board 94, which certain part lies between the shutter section 8 and the movable lens section 32. A connector 96 constituting an electrical connecting section is secured through soldering to the conductor pads 106, 106. The connector 96 is fitted to a connector 97 constituting the electrical connecting section, which connector is electrically connected to electric wires 98, 98 of an electrical wiring extending from the solenoid device 42. The electric wires 98, 98 of the electrical wiring extending from the solenoid device 42 are thus electrically connected to the certain part of the flexible circuit board 94.

As one of important features of this embodiment, pillar-shaped protrusions (i.e., cam followers) 48, 48, 48 of a frame body 46 of the movable lens section 32 are offset backwardly from the movable lens section 32, such that the connector 96 is capable of being located between the shutter section 8 and the movable lens section 32. Therefore, the portions of the frame body 46 that support the pillar-shaped protrusions 48, 48, 48 are capable of being formed so as to be offset backwardly toward the side of the image formation plane. Accordingly, the connector 96 constituting the electrical connecting section is capable of being located between the shutter section 8 and the movable lens section 32.

Figure 2A:
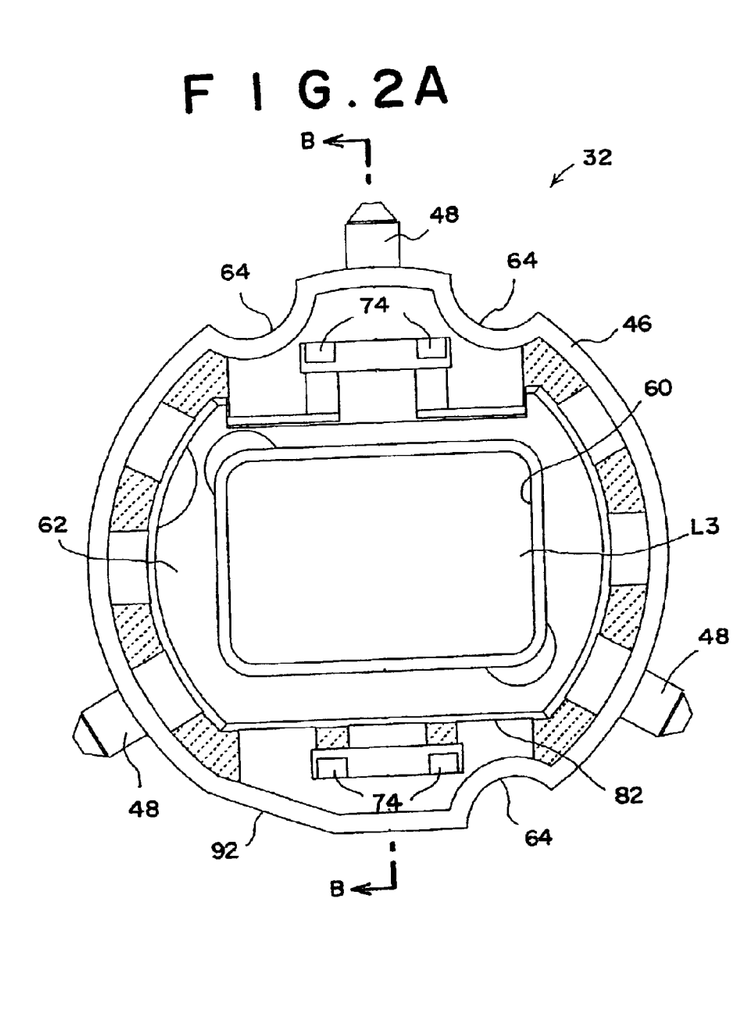
FIG. 2A is a front view showing a movable lens section in the lens barrel of FIG. 1.
Figure 2B:
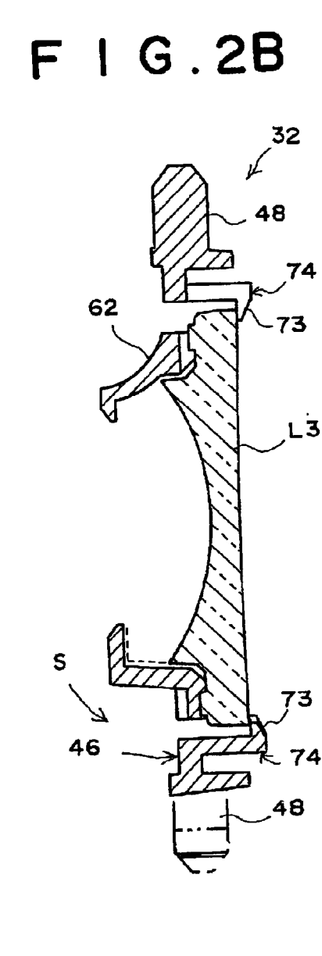
FIG. 2B is a sectional view taken on line B—B of FIG. 2A.
Figure 3:
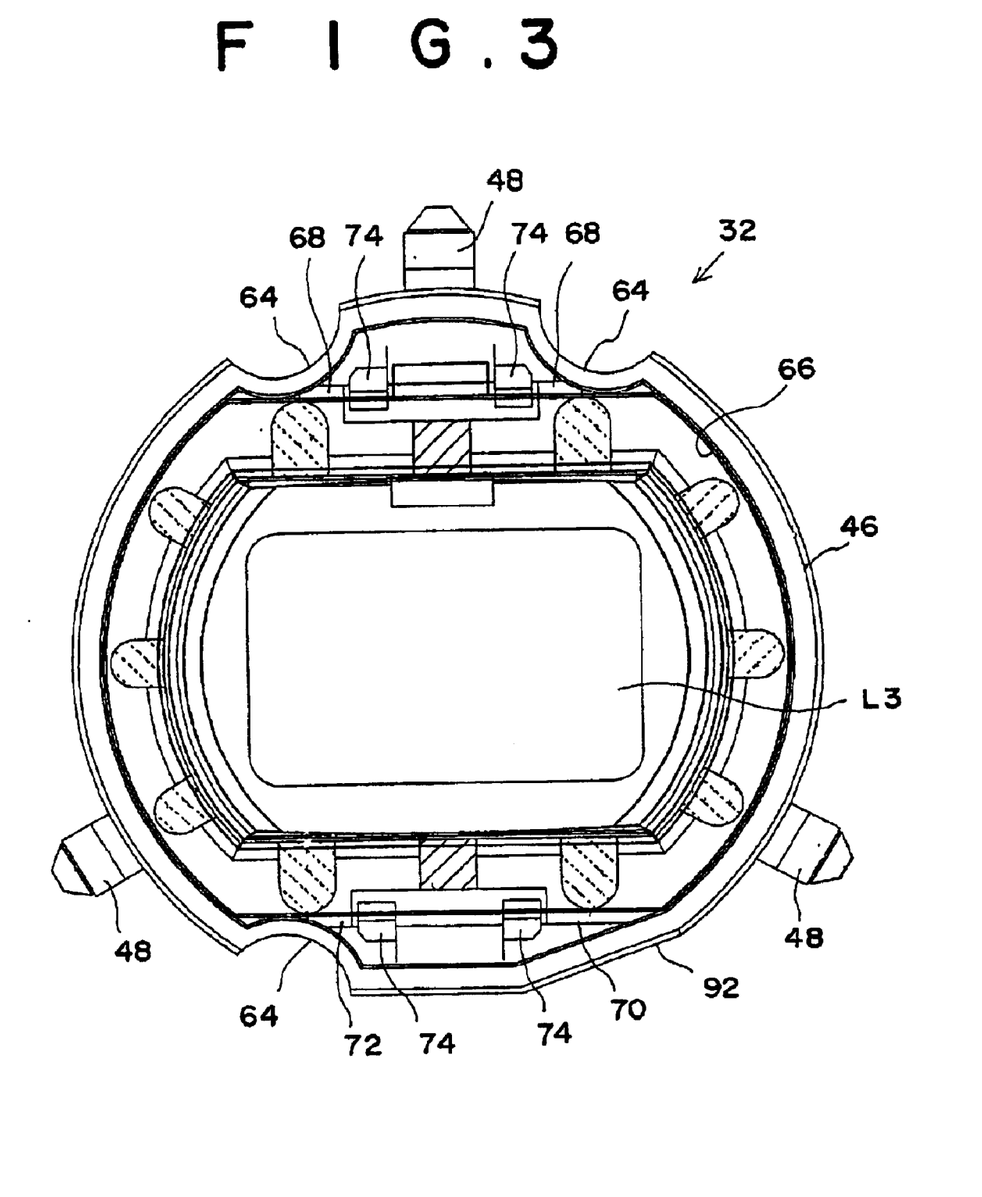
FIG. 3 is a rear view showing the movable lens section of FIG. 2A.
Figure 4A:
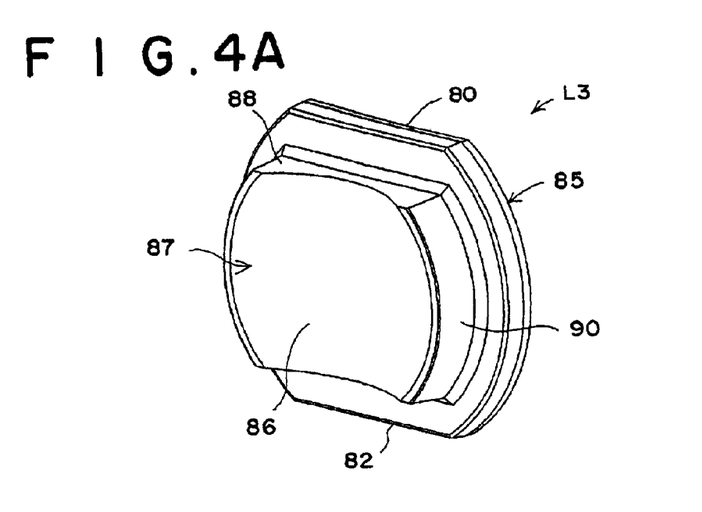
FIG. 4A is a perspective view showing a lens employed in the movable lens section of FIG. 2A.
Figure 4B:
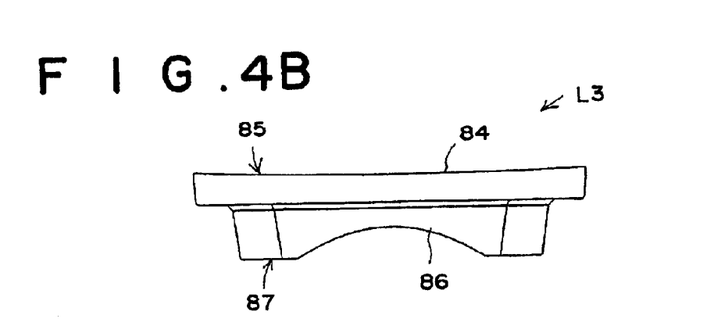
FIG. 4B is a plan view showing the lens of FIG. 4A.
Figure 4C:
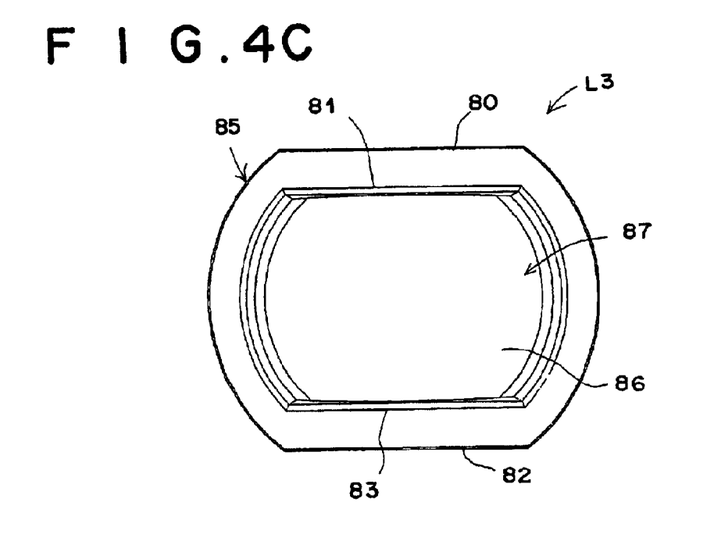
FIG. 4C is a front view showing the lens of FIG. 4A.

The movable lens section 32 will be described hereinbelow with reference to FIGS. 2A, 2B, FIG. 3, and FIGS. 4A, 4B 4C. FIG. 2A is a front view showing the movable lens section 32. FIG. 2B is a sectional view taken on line B—B of FIG. 2A. FIG. 3 is a rear view showing the movable lens section 32. FIG. 4A is a perspective view showing the lens L3 acting as a rear-set lens in the movable lens section 32. FIG. 4B is a plan view showing the lens L3 of FIG. 4A. FIG. 4C is a front view showing the lens L3 of FIG. 4A.

The movable lens section 32 comprises a frame body 46, which is made from a resin, and the lens L3, which is fitted into and secured to the frame body 46. The frame body 46 is provided with the pillar-shaped protrusions 48, 48, 48, which are formed at the upper and lower sections of the frame body 46 and act as cam followers. The pillar-shaped protrusions 48, 48, 48 engage with the spiral cam groove 30 of the cam cylinder 26 and are cam-driven by the rotation of the cam cylinder 26, i.e. the rotation of the movable cylinder 4, so as to move along the direction of the optical axis 6. Such that the frame body 46 moves linearly instead of rotating, the rectilinear moving cylinder 16 is provided with slots 50, 50, 50 extending along the direction of the optical axis 6, and the pillar-shaped protrusions 48, 48, 48 pass through the slots 50, 50, 50 and engage with the spiral cam groove 30. Therefore, when the frame body 46 is driven by the spiral cam groove 30, the frame body 46 is capable of moving rectilinearly within the slots 50, 50, 50.

The frame body 46 has an approximately circular disk-like outer shape capable of being located within the rectilinear moving cylinder 16. Also, a base 62 having a rectangular opening 60 is formed at a center region of the frame body 46. The base 62 and the frame body 46 are combined into an integral body. The rectangular opening 60 allows the light to pass through the lens L3. The pillar-shaped protrusions 48, 48, 48 described above are combined with the frame body 46 into an integral body. As illustrated in FIG. 2A and FIG. 3, one pillar-shaped protrusion 48 is formed on the upper side of the frame body 46, and two pillar-shaped protrusions 48, 48 are formed on the lower side of the frame body 46. The three pillar-shaped protrusions 48, 48, 48 are approximately equally spaced from one another. In FIG. 2B, the lower pillar-shaped protrusion 48 is illustrated imaginarily in order to indicate its position with respect to the direction of the optical axis 6. Two circular arc-shaped recesses 64, 64 are formed on the upper side of the outer periphery of the frame body 46, and one circular arc-shaped recess 64 is formed on the lower side of the outer periphery of the frame body 46. The circular arc-shaped recesses 64, 64, 64 act as relief for screw pedestals (not shown) for securing the rectilinear moving key-ring 5 to the rectilinear moving cylinder 16 by screws.

As illustrated in FIG. 3, a recess 66, which communicates with the rectangular opening 60 described above, is formed at the rear region of the frame body 46. The right and left sides of the recess 66 are formed in a circular arc-like shape, and the upper and lower sides of the recess 66 are formed in a flat shape. Two upper engagement arms 74, 74 are projected from the rear surface of the frame body 46 at positions adjacent to upper flat wall sections 68, 68 constituting the recess 66. Also, two lower engagement arms 74, 74 are projected from the rear surface of the frame body 46 at positions adjacent to lower flat wall sections 70, 72 constituting the recess 66. As illustrated in FIG. 2B, each of the four engagement arms 74, 74, 74, 74 is provided with an engagement claw 73 at an end. The engagement claw 73 is utilized for securing the lens L3.

The lens L3 fitted into the recess 66 will be described hereinbelow. As illustrated in detail in FIGS. 4A, 4B, and 4C, the lens L3 is formed in a shape in which upper and lower parts of a circular concave lens have been cut away. Specifically, since the image formation plane of film is long in the horizontal direction and short in the vertical direction, the upper and lower parts of the concave lens, which do not contribute to the image recording, are cut away. A flat peripheral region 80 is formed at the top of the lens L3, and a flat peripheral region 82 is formed at the bottom of the lens L3. The lens L3 is provided with a base section 85 on the back side of the lens L3. The base section 85 is provided with a concave surface 84 having a large radius of curvature. Also, the lens L3 is provided with a convex section 87 on the front side of the lens L3. The convex section 87 is provided with a concave surface 86 having a small radius of curvature. The concave surface 86 has a shape approximately similar to the shape of the outer periphery of the lens L3 and smaller than the size of the outer periphery of the lens L3. The concave surface 86 is combined with the connector into an integral body via step-like sections 88 and 90.

The lens L3 has the outer shape capable of fitting into and being seated on the recess 66 described above. As illustrated in FIG. 2B and FIG. 3, when the lens L3 is fitted into the recess 66 of the frame body 46, the lens L3 engages with the engagement claws 73, 73, 73, 73 of the engagement arms 74, 74, 74, 74 and is thus secured to the frame body 46. Besides the circular arc-shaped recesses 64, 64, 64, a relieved section 92 is formed at the outer periphery of the frame body 46. The relieved section 92 is located on the side corresponding to the flat peripheral region 82 of the lens L3, i.e. on the lower side of the outer periphery of the frame body 46. The relieved section 92 allows the flexible circuit board 94 described above to pass thereunder. Since the flat peripheral region 82 is formed on the lower side of the lens L3, it becomes possible for the relieved section 92 to be formed on the frame body 46.

As found from FIG. 2B, the pillar-shaped protrusion 48 is formed such that it is offset backwardly toward the side of the image formation plane and at the position in the vicinity of the flat peripheral region 82 of the lens L3. Therefore, a predetermined space S is formed under the base 62 of the frame body 46. Specifically, since the pillar-shaped protrusion 48 is offset backwardly, the section of the frame body 46, which section supports the pillar-shaped protrusion 48, is capable of being off set backwardly. As a result, the predetermined space S is capable of being formed in front of the frame body 46. More specifically, the pillar-shaped protrusion 48 acting as the cam follower is formed such that the predetermined space S is capable of being formed on the side outward from the flat peripheral region 82 of the lens L3. Also, as illustrated in FIG. 4C, the lens L3 has flat regions 81 and 83 at the convex section 87. Therefore, the shape of the frame body 46 is capable of being set so as to match with the shape of the flat regions 81 and 83 of the lens L3. Accordingly, the predetermined space S is capable of being set to be broad.

Reverting to FIG. 1, a cover member 52 having a barrier 54 is fitted to the front end section of the movable cylinder 4 in order to protect the lenses L (the lenses L1, L2, and L3). Though not described in detail herein, the cover member 52 rotates and moves together with the movable cylinder 4.

Figure 5:
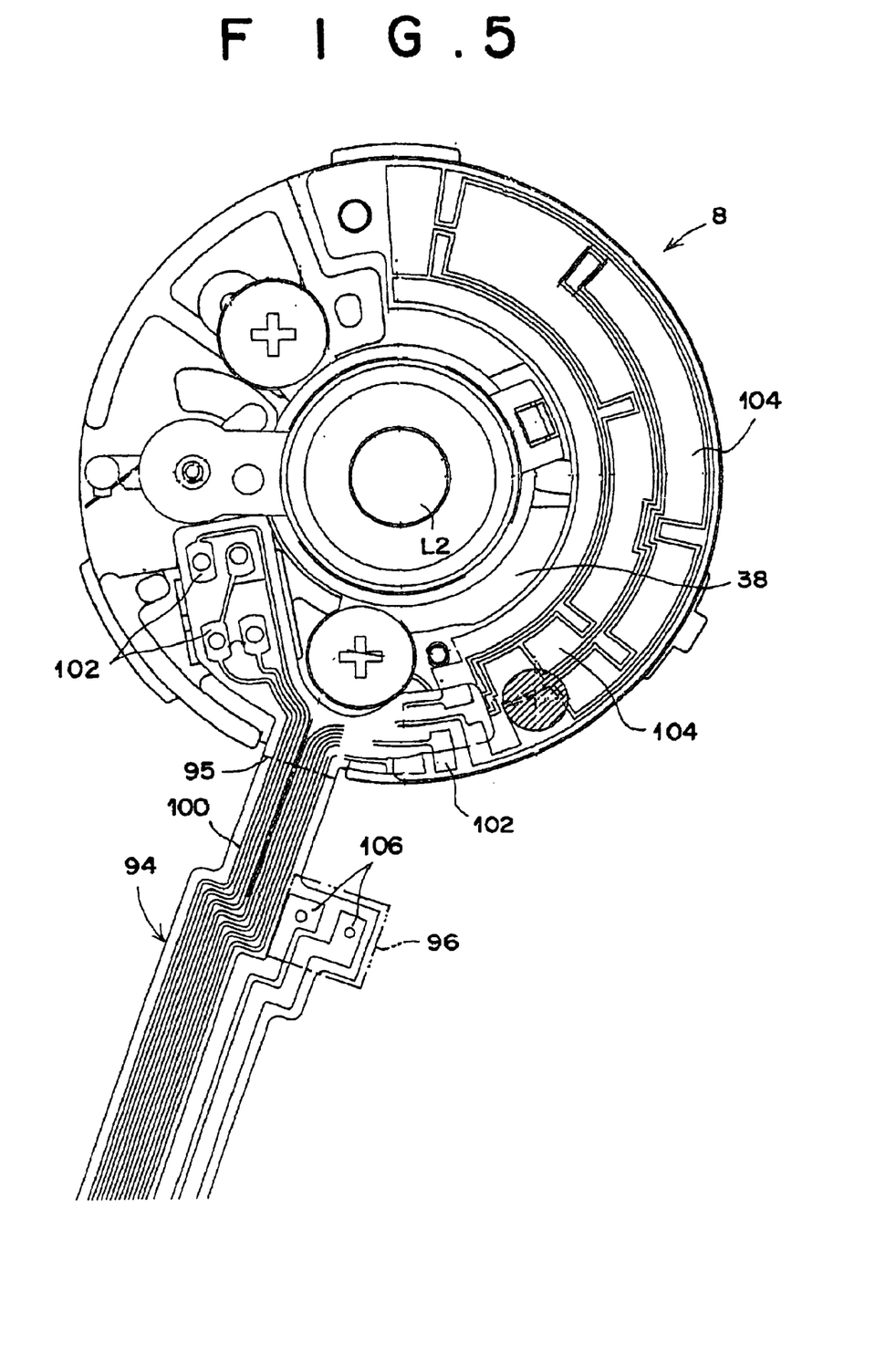
FIG. 5 is a developed view showing a shutter section and a flexible circuit board electrically connected to the shutter section.

The flexible circuit board 94 will be described hereinbelow with reference to FIG. 5. FIG. 5 is a developed view showing the shutter section 8 and the flexible circuit board 94 electrically connected to the shutter section 8. The flexible circuit board 94 has a long, narrow strip-like shape, and a printed wiring (i.e., a printed circuit) 100 is located approximately in parallel along the longitudinal direction of the flexible circuit board 94. The flexible circuit board 94 has electrodes, i.e. conductor pads 102, 102, . . . , at an end section. The conductor pads 102, 102, . . . of the flexible circuit board 94 are electrically connected by soldering to electrodes (i.e., conductor pads) 104, 104, . . . of the shutter section 8. The electrodes 104, 104, . . . are constituted of a plurality of circular arc-shaped sections, which are formed partially along the outer periphery of the wall member 38. When the movable cylinder 4 is rotated, a contact piece (not shown) for position detection, which contact piece is associated with the movable cylinder 4 described above, slides with respect to the electrodes 104, 104, . . . In this manner, the position, to which the lens has been delivered, is detected. Specifically, the contact piece and the electrodes 104, 104, . . . act as a sensor.

Also, conductor pads 106, 106 are formed along a side of the flexible circuit board 94. The flexible circuit board 94 is bent at a bending section 95 toward the background side of the plane of the sheet of FIG. 5 such that, when the shutter section 8 has been located within the lens barrel, the flexible circuit board 94 extends toward the camera main body 1. The conductor pads 106, 106 are associated with the connector 96. The electric wires 98, 98 coming from the solenoid device 42 as illustrated in FIG. 1 are electrically connected to the connector 97. The connector 97 is electrically connected to the connector 96, and the solenoid device 42 is thereby electrically connected to the side of the camera main body 1.

Figure 6:
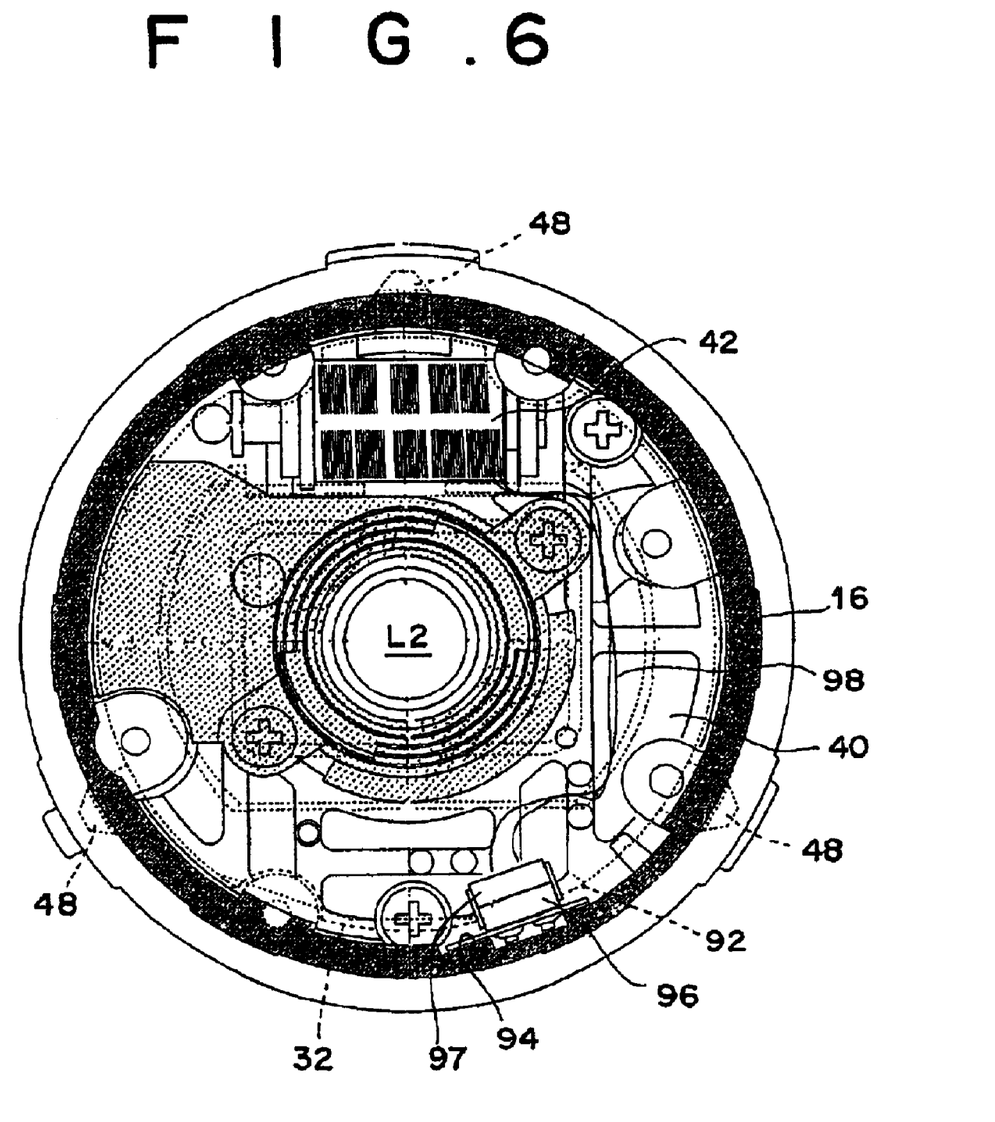
FIG. 6 is a schematic view showing connectors located within a lens barrel, the view being taken from a direction indicated by the arrow V6 in FIG. 1.

FIG. 6 is a schematic view showing the connectors 96 and 97 located within the lens barrel, the view being taken from a direction indicated by the arrow V6 in FIG. 1. As illustrated in FIG. 6, within the lens barrel, the electric wires 98, 98 coming from the solenoid device 42 pass through positions, which do not interfere with the lens L2, and extend to the connector 97. Also, the flexible circuit board 94 is located along the inner surface of the rectilinear moving cylinder 16. Further, it can be found that the flexible circuit board 94 is located under relieved section 92 of the movable lens section 32 described above.

Figure 7:
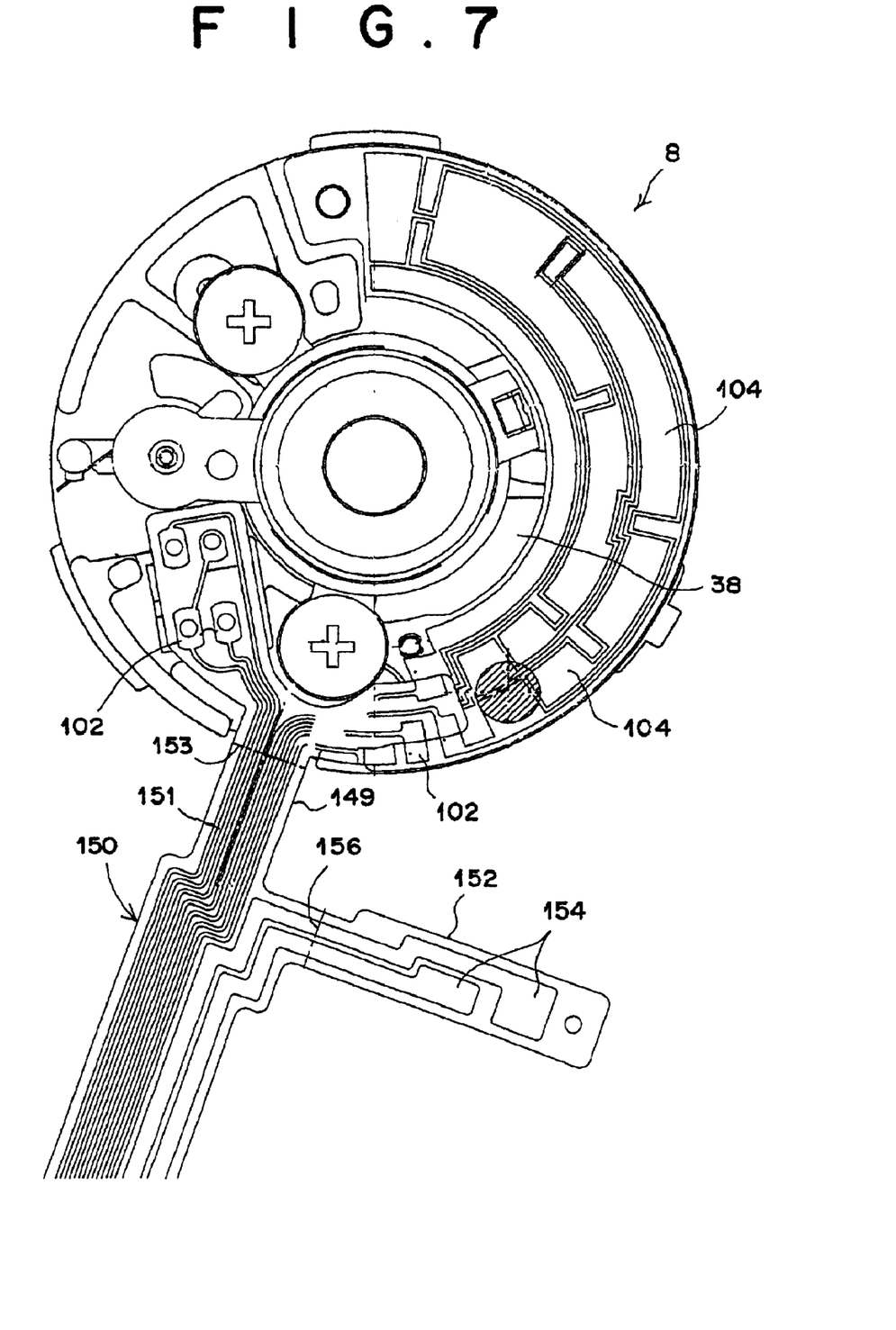
FIG. 7 is a developed view, similar to FIG. 5, showing the shutter section and a flexible circuit board electrically connected to the shutter section in a second embodiment of the electrical connecting structure in a lens barrel of a camera in accordance with the present invention.

A second embodiment of the electrical connecting structure in a lens barrel of a camera in accordance with the present invention will be described hereinbelow with reference to FIG. 7 and FIG. 8. FIG. 7 is a developed view, similar to FIG. 5, showing the shutter section 8 and a flexible circuit board 150 electrically connected to the shutter section 8 in the second embodiment of the electrical connecting structure in a lens barrel of a camera in accordance with the present invention. In FIG. 7, similar elements are numbered with the same reference numerals with respect to FIG. 5. In the second embodiment of the electrical connecting structure in a lens barrel of a camera in accordance with the present invention, the shutter section 8 is identical with the shutter section 8 shown in FIG. 5, and only the flexible circuit board 150 is different from the flexible circuit board 94 shown in FIG. 5. The flexible circuit board 150 is provided with a circuit extension (i.e., an electrical connecting section) 152, which projects from a side edge 149 of the flexible circuit board 150 in a direction intersecting with the longitudinal direction of the flexible circuit board 150 and is combined with the flexible circuit board 150 into an integral body. Conductor pads (i.e., electrodes) 154, 154 are formed on the circuit extension 152. The conductor pads 154, 154 are formed on the same side of the flexible circuit board 150 as the conductor pads 102, 102, . . . , which are to be connected to the side of the wall member 38, i.e. on the foreground side of the plane of the sheet of FIG. 7. Ordinarily, in cases where a plurality of conductor pads are formed on a circuit board, it is advantageous from the view point of cost that the plurality of the conductor pads are formed on the same side, i.e. on the same surface, of the circuit board. Therefore, in the second embodiment, the conductor pads 154, 154 are formed on the same side of the flexible circuit board 150 as the conductor pads 102, 102, . . . .

In the second embodiment, the electric wires 98, 98 coming from the solenoid device 42 as shown in FIG. 1 are electrically connected by soldering to the conductor pads 154, 154. Therefore, the circuit extension 152 is bent at a bending section 156 toward the background side of the plane of the sheet of FIG. 7, and the region of the bent circuit extension 152 now overlapping upon the flexible circuit board 150 is adhered and secured to the flexible circuit board 150 by use of an adhesive agent. Also, a main region 151 of the flexible circuit board 150 is bent at a bending section 153 toward the background side of the plane of the sheet of FIG. 7. As a result, the conductor pads 154, 154 stand facing the solenoid device 42. Therefore, the electric wires 98, 98 are capable of being easily connected by soldering to the conductor pads 154, 154. The state, in which the soldering section (i.e., the electrical connecting section) has been located within the lens barrel, is illustrated in FIG. 8.

Figure 8:
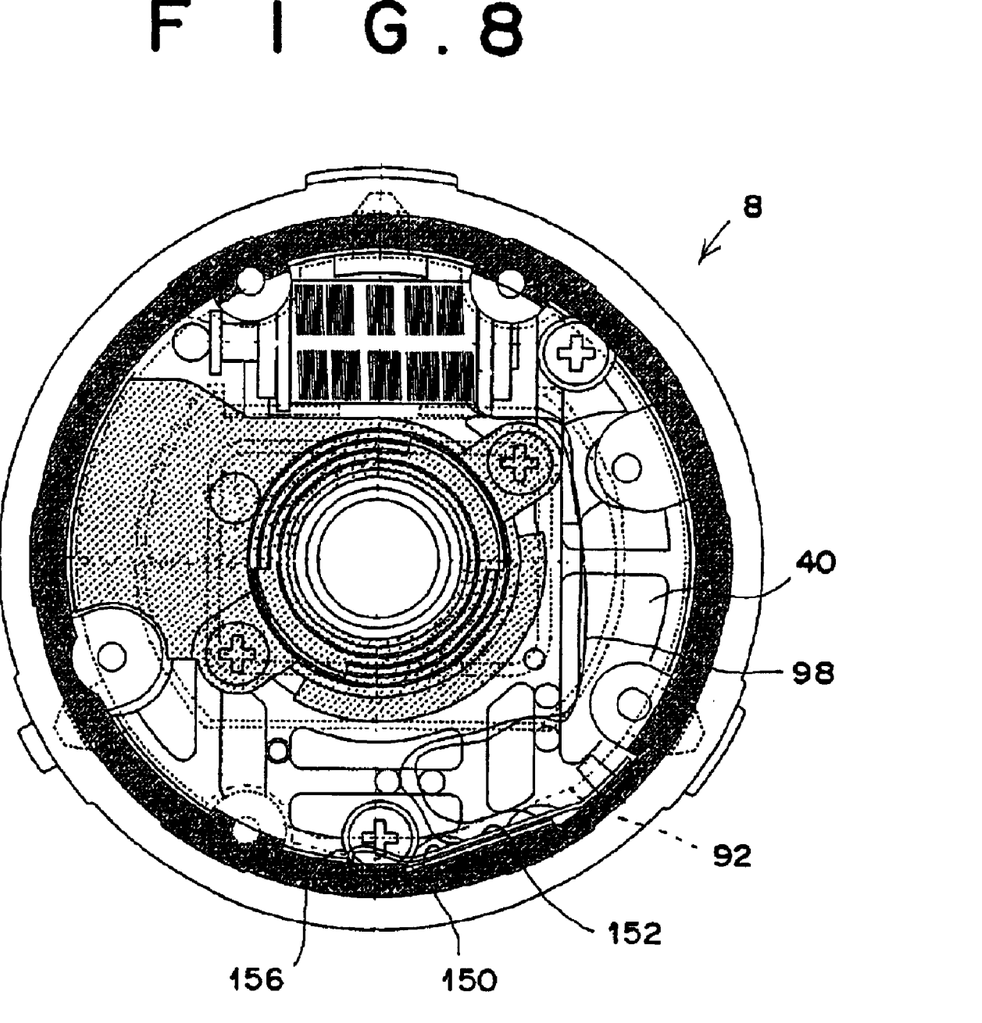
FIG. 8 is a schematic view, similar to FIG. 6, showing an electrical connecting section located within a lens barrel in the second embodiment of the electrical connecting structure in a lens barrel of a camera in accordance with the present invention, the view being taken from the direction indicated by the arrow V6 in FIG. 1.

FIG. 8 is a schematic view, similar to FIG. 6, showing the electrical connecting section located within the lens barrel in the second embodiment of the electrical connecting structure in a lens barrel of a camera in accordance with the present invention, the view being taken from the direction indicated by the arrow V6 in FIG. 1. FIG. 8 clearly shows the state, in which the electric wires 98, 98 are electrically connected to the flexible circuit board 150 having been bent at the bending section 156. In the second embodiment, as illustrated in FIG. 8, the flexible circuit board 150 is located under the relieved section 92 described above.

The electrical connecting structure in a lens barrel of a camera in accordance with the present invention is not limited to the use in a specific camera and is applicable to various kinds of cameras provided with a zoom lens. For example, the electrical connecting structure in a lens barrel of a camera in accordance with the present invention is capable of being utilized in APS cameras utilizing IX240, 135 cameras, 645 size cameras utilizing Brownie film, and the like.

What is claimed is:

1. An electrical connecting structure in a lens barrel of a camera, the camera comprising a shutter section located within a lens barrel, a front-set lens secured to the shutter section, and a rear-set lens, which is associated with a plurality of cam followers and is driven through a cam so as to move along an optical axis direction and with respect to the front-set lens, an electrical connecting section, at which a certain part of an electrical wiring extending from the shutter section toward a camera main body and an electrical wiring extending from a shutter actuating section associated with the shutter section are electrically connected to each other, being located within the lens barrel, wherein:

the rear-set lens has at least one flat peripheral region at a periphery of the rear-set lens, a cam follower, which is disposed on the side of the flat peripheral region of the rear-set lens, is located such that a predetermined space is formed on the side outward from the flat peripheral region of the rear-set lens, the predetermined space is ensured between the front-sec lens and the rear-set lens in a state, in which the rear-set lens takes a position optically closest to the front-set lens, the electrical wiring, which extends from the shutter section toward the camera main body, is constituted of a long, narrow strip-shaped flexible circuit board, passes through a position in the vicinity of the flat peripheral region of the rear-set lens, and extends toward the camera main body, the electrical connecting section is located within the predetermined space, the long, narrow strip-shaped flexible circuit board is provided with conductor cads at a part which is to be located within the predetermined space, one of two connectors is electrically connected to the conductor pads, the other connector is electrically connected to the electrical wiring, which extends from the shutter actuating section, the electrical connecting section, at which the one connector and the other connector are electrically connected to each other, is located within the predetermined space, the rear-set lens also has a different flat peripheral region at the periphery of the rear-set lens, which periphery is on the side facing the shutter actuating section, and the shutter actuating section and the electrical connecting section are located on the sides opposite to each other with the optical axis intervening therebetween.

2. An electrical connecting structure in a lens barrel of a camera, the camera comprising a shutter section located within a lens barrel, a front-set lens secured to the shutter section, and a rear-set lens, which is associated with a plurality of cam followers and is driven through a cam so as to move along an optical axis direction and with respect to the front-set lens, an electrical connecting section, at which a certain part of an electrical wiring extending from the shutter section toward a camera main body and an electrical wiring extending from a shutter actuating section associated with the shutter section are electrically connected to each other, being located within the lens barrel, wherein the rear-set lens has at least one flat peripheral region at a periphery of the rear-set lens, a cam follower, which is disposed on the side of the flat peripheral region of the rear-set lens, is located such that a predetermined space is formed on the side outward from the flat peripheral region of the rear-set lens, the predetermined space is ensured between the front-set lens and the rear-set lens in a state, in which the rear-set lens takes a position optically closest to the front-set lens, the electrical wiring, which extends from the shutter section toward the camera main body, passes through a position in the vicinity of the flat peripheral region of the rear-set lens and extends toward the camera main body, the electrical connecting section is located within the predetermined space, the electrical wiring, which extends from the shutter section toward the camera main body, is constituted of a long, narrow strip-shaped flexible circuit board, the long, narrow strip-shaped flexible circuit board is provided with a circuit extension at a part, which is to be located within the predetermined space, the circuit extension being projected from the part of the long, narrow strip-shaped flexible circuit board in a direction intersecting with a longitudinal direction of the long, narrow strip-shaped flexible circuit board, the circuit extension is folded back so as to act as the electrical connecting section having electrodes on the side facing the shutter actuating section, the rear-set lens also has a different flat peripheral region at the periphery of the rear-set lens, which periphery is on the side facing the shutter actuating section, and the shutter actuating section and the electrical connecting section are located on the sides opposite to each other with the optical axis intervening therebetween.

3. An electrical connecting structure in a lens barrel of a camera, the camera comprising a shutter section located within a lens barrel, a front-set lens secured to the shutter section, and a rear-set lens, which is associated with a plurality of cam followers and is driven through a cam so as to move along an optical axis direction and with respect to the front-set lens, an electrical connecting section, at which a certain part of an electrical wiring extending from the shutter section toward a camera main body and an electrical wiring extending from a shutter actuating section associated with the shutter section are electrically connected to each other, being located within the lens barrel, wherein the rear-set lens has at least one flat peripheral region at a periphery of the rear-set lens, a cam follower, which is disposed on the side of the flat peripheral region of the rear-set lens, is located such that a predetermined space is formed on the side outward from the flat peripheral region of the rear-set lens, the predetermined space is ensured between the front-set lens and the rear-set lens in a state in which the rear-set lens takes a position a optically closest to the front-set lens, the electrical wiring, which extends from the shutter section toward the camera main body, passes through a position in the vicinity of the flat peripheral region of the rear-set lens and extends toward the camera main body, the electrical connecting section is located within the predetermined space, the electrical wiring, which extends from the shutter section toward the camera main body, is constituted of a long, narrow strip-shaped flexible circuit board, the long, narrow strip-shaped flexible circuit board is provided with conductor pads at a part, which is to be located within the predetermined space, one of two connectors is electrically connected to the conductor pads, the other connector is electrically connected to the electrical wiring, which extends from the shutter actuating section, and the electrical connecting section, at which the one connector and the other connector are electrically connected to each other, is located within the predetermined space.

4. An electrical connecting structure in a lens barrel of a camera, the camera comprising a shutter section located within a lens barrel, a front-set lens secured to the shutter section, and a rear-set lens, which is associated with a plurality of cam followers and is driven through a cam so as to move along an optical axis direction an with respect to the front-set lens, an electrical connecting section, at which a certain part of an electrical wiring extending from the shutter section toward a camera main body and an electrical wiring extending from a shutter actuating section associated with the shutter section are electrically connected to each other, being located within the lens barrel, and wherein:

the rear-set lens has at least one flat peripheral region at a periphery of the rear-set lens,     a cam follower, which is disposed on the side of the flat peripheral region of the rear-set lens, is located such that a predetermined space is formed on the side outward from the flat peripheral region of the rear-set lens,     the predetermined space is ensured between the front-set lens and the rear-set lens in a state in which the rear-set lens takes a position optically closest to the front-set lens,     the electrical wiring, which extends from the shutter section toward the camera main body, passes through a position in the vicinity of the flat peripheral region of the rear-set lens and extends toward the camera main body,     the electrical connecting section is located within the predetermined space,     the rear-set lens also has a different flat peripheral region at the periphery of the rear-set lens, which periphery is on the side facing the shutter actuating section, and     the shutter actuating section and the electrical connecting section are located on the sides opposite to each other with the optical axis intervening therebetween.

* * * * *